W. T. MacDONALD.
PISTON ROD PACKING.
APPLICATION FILED JAN. 23, 1914.

1,211,205.

Patented Jan. 2, 1917.

Witnesses
M. DeGrange

Inventor
W. T. MacDonald
By
Attorney

UNITED STATES PATENT OFFICE.

WILLIAM T. MacDONALD, OF SOMERVILLE, MASSACHUSETTS.

PISTON-ROD PACKING.

1,211,205.  Specification of Letters Patent.  Patented Jan. 2, 1917.

Application filed January 23, 1914. Serial No. 813,923.

*To all whom it may concern:*

Be it known that I, WILLIAM T. MAC-DONALD, a citizen of the United States, residing at Somerville, in the county of Middlesex and State of Massachusetts, have invented certain new and useful Improvements in Piston-Rod Packing; and I do hereby declare the following to be a full, clear, and exact description of the invention, such as will enable others skilled in the art to which it appertains to make and use the same.

This invention relates to piston rod packing, and one of the principal objects of the same is to provide a reliable and efficient packing which will not require frequent renewal and which is composed of materials which can be compressed within the stuffing box as occasion requires during the wear of the packing.

Another object of the invention is to provide a piston rod packing which will be automatically lubricated and which will permit of adjustment to take up wear and thus extend the life of the packing and not require frequent renewals.

Figure 1:
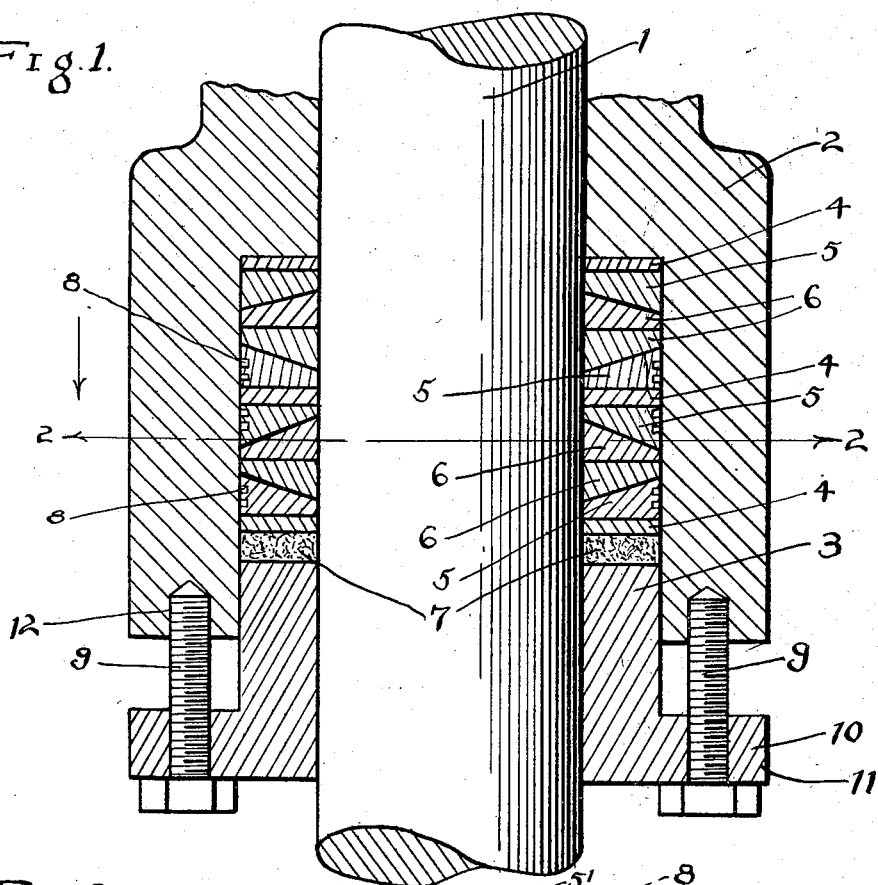
Figure 2:
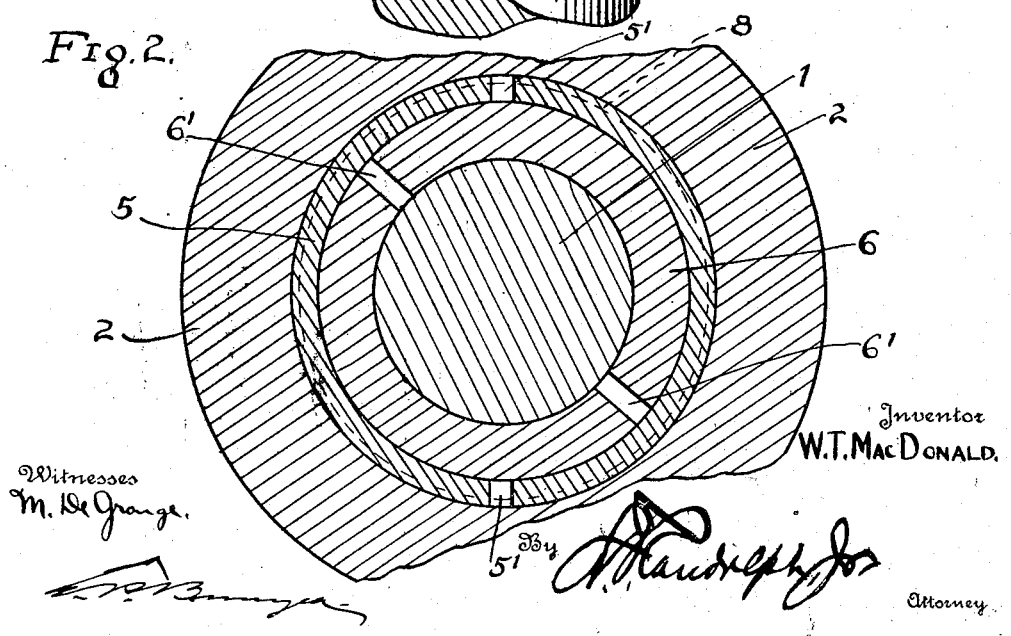

These and other objects may be attained by means of the construction illustrated in the accompanying drawings, in which, Figure 1 is a sectional view of the stuffing box, the gland and the packing, and Fig. 2 is a sectional view taken on the line 2—2 of Fig. 1 looking in the direction indicated by the arrow.

Referring to the drawings the numeral 1 designates a piston rod or a sucker rod of a pump, 2 is the stuffing box and 3 is the gland.

The packing comprises a ring 4 of lead which is forced up against the shoulder of the stuffing box 2. The rings 5 are formed of Babbitt metal and are semi-circular sections surrounding the rod 1 and allowing a certain space 5' at each end to compensate for wear. The ring members 5 are beveled and when pressure is brought to bear on the same they are crowded outward against the inner wall of the stuffing box 2. The ring members 6 are also of Babbitt metal and they are beveled oppositely to the ring members 5 and hence are crowded inward by pressure toward the rod 1. Upon reference to Fig. 1 it will be seen that there are three lead rings 4 surrounding the piston rod 1 and that at opposite sides of the central lead ring 4 the Babbitt metal ring sections are disposed and arranged to press outward and inward against the rod 1 and against the inner wall of the stuffing box 2, and said sections are arranged to break joints as shown at 5' and 6'.

An absorbent packing ring 7 preferably of flax is placed in the stuffing box and surrounds the rod 1, said absorbent packing ring adapted to contain a quantity of oil or other lubricant, and the packing rings are provided with oil grooves or ducts 8 to contain a quantity of the oil and to feed it to the shaft through the spaces 5' and 6'.

The adjusting screws 9 extend through the flange 10 of the gland and engage a threaded socket 12 in the end of the stuffing box. When the screws 9 are turned to force the gland in the stuffing box, the joint is rendered absolutely tight and these screws may be used for adjusting the packing at any time to take up wear.

From the foregoing it will be obvious that the piston rod packing can be readily removed for renewal whenever required and that owing to the construction of the half sections of the rings and the intermediate lead rings that the packing may be crowded in the stuffing box to take up wear at times when this is found necessary, and that owing to the construction and arrangement shown the packing will wear a long time.

What is claimed is:—

In combination, a stuffing box having an enlarged bore, a shaft extending therethrough and a gland detachably secured to the box and extending therein, of a plurality of lead rings positioned within the bore and at points at each end thereof and intermediate its ends, Babbitt metal rings beveled in the direction of their inner edges and positioned adjacent the lead rings, Babbitt metal rings beveled in the direction of their outer edges and positioned between the first mentioned Babbitt rings, and an absorbent packing ring positioned adjacent the gland within the bore for furnishing the rings with lubricant.

In testimony whereof I affix my signature in presence of two witnesses.

WILLIAM T. MacDONALD.

Witnesses:
 DUNCAN G. CAMPBELL,
 FREDERICK A. GREENE.

Copies of this patent may be obtained for five cents each, by addressing the "Commissioner of Patents, Washington, D. C."